United States Patent
Lee

(10) Patent No.: US 7,364,134 B2
(45) Date of Patent: Apr. 29, 2008

(54) OPTICAL FIBER UNIT INSTALLATION APPARATUS INCLUDING A UNIT FOR PREVENTING BACKWARD FLOWING OF FLUID

(75) Inventor: Bong-Hoon Lee, Gyeonggi-do (KR)

(73) Assignee: LS Cable Ltd., Seoul (KR)

( * ) Notice: Subject to any disclaimer, the term of this patent is extended or adjusted under 35 U.S.C. 154(b) by 165 days.

(21) Appl. No.: 10/552,799

(22) PCT Filed: Sep. 30, 2003

(86) PCT No.: PCT/KR03/02004

§ 371 (c)(1),
(2), (4) Date: Oct. 11, 2005

(87) PCT Pub. No.: WO2004/090597

PCT Pub. Date: Oct. 21, 2004

(65) Prior Publication Data

US 2006/0280416 A1 Dec. 14, 2006

(30) Foreign Application Priority Data

Apr. 11, 2003 (KR) .................. 10-2003-0023020

(51) Int. Cl.
*E21C 29/16* (2006.01)
(52) U.S. Cl. .................. 254/134.4; 254/134.3 R
(58) Field of Classification Search ............ 254/134.4, 254/134.3 R
See application file for complete search history.

(56) References Cited

U.S. PATENT DOCUMENTS

| 3,525,973 | A | * | 8/1970 | Kipnes ................. 439/353 |
| 5,328,273 | A | * | 7/1994 | Nonaka et al. ........... 384/206 |
| 5,664,763 | A | * | 9/1997 | Sano et al. ............ 254/134.4 |
| 6,311,953 | B1 | * | 11/2001 | Lang et al. ........... 254/134.4 |
| 6,364,290 | B1 | * | 4/2002 | Barker ............... 254/134.4 |
| 6,402,123 | B1 | * | 6/2002 | Rivard .............. 254/134.4 |
| 2006/0280416 | A1 | * | 12/2006 | Lee .................. 385/134 |

OTHER PUBLICATIONS

International Search Report for PCT/KR2003/002004.

* cited by examiner

*Primary Examiner*—Lee D Wilson
(74) *Attorney, Agent, or Firm*—Jones Day

(57) ABSTRACT

An optical fiber unit installation apparatus having a unit for preventing a fluid from flowing backward toward entrance of the optical unit to prevent fluid leakage while the optical fiber unit is installed using air pressure is disclosed. The apparatus includes an optical fiber unit supplier; a blowing head having an entrance for introduction of an optical fiber unit supplied from the supplier, and an exit communicated with the entrance and combined with a tube for air pressure installation; a pressing unit for applying air pressure to the optical fiber unit introduced into the blowing head to insert the optical fiber unit into the tube; and a fiber sealing unit, an aggregation of fur-type elastic fibers, mounted in an advancing path of the optical fiber unit through the blowing head to prevent fluid leakage by surrounding the optical fiber unit with fiber ends contacted thereon.

8 Claims, 3 Drawing Sheets

OPTICAL FIBER UNIT INSTALLATION APPARATUS INCLUDING A UNIT FOR PREVENTING BACKWARD FLOWING OF FLUID

TECHNICAL FIELD

The present invention relates to an optical fiber unit installation apparatus, and more particularly to an optical fiber unit installation apparatus having a unit for preventing a fluid from flowing backward toward an entrance of the optical fiber unit to prevent a fluid leakage while the optical fiber unit is installed using air pressure.

BACKGROUND ART

A method for previously setting up a tube for air pressure installation at an optical fiber installation spot and then installing an optical fiber unit in the tube by air pressure is very widely used as an optical fiber installation technique at a narrow space such as FTTH (Fiber To The Home) since it ensures easy installation and removal of the optical fiber unit and requires low costs for construction.

FIG. 1 is a perspective view showing an appearance of a general optical fiber unit for air pressure installation, commonly called as ABF (Air Blown Fiber).

Referring to FIG. 1, the optical fiber unit U includes an optical fiber bundle 10 commonly having 1 to 12 cores, and a buffer coating layer 11 formed on the bundle 10. On the surface of the buffer coating layer 11, glass beads 12 are additionally formed to decrease fractional force with the inner surface of the tube for air pressure installation and increase drag force caused by the air pressure. When required, a polymer foaming layer or a Teflon coating layer may be provided on the buffer coating layer 11 in order to increase the drag force.

FIG. 2 is a schematic view showing a conventional air pressure installation apparatus which inserts the optical fiber unit U configured as above into a tube by means of air pressure.

Referring to FIG. 2, the conventional optical fiber unit installation apparatus includes an optical fiber unit supplier 20, a blowing head 21 having an entrance A into which the optical fiber unit U successively provided from the optical fiber unit supplier 20 is introduced and an exit B communicated with the entrance A and combined with an air pressure installation tube 22, a pressing unit 26 for applying a compressed air to the exit B of the blowing head 21 so that the optical fiber unit U introduced into the entrance A is inserted into the air pressure installation tube 22, a driving roller unit 23 for pushing the optical fiber unit U into the air pressure installation tube 22 with rotating on both sides of the optical fiber unit U, and a buckling sensor 25 for sensing that movement of the optical fiber unit U is prohibited in the tube 22 by an obstacle and then stopping the installation.

In the conventional optical fiber unit installation apparatus, the optical fiber unit U, continuously introduced into the blowing head 21, is inserted and installed in the installation tube 22 by the air pressure provided from the pressing unit 26 with controlling its advancing speed by the driving roller unit 23.

Meanwhile, the blowing head 21 has a sealing unit 24 to prevent the compressed air supplied from the pressing unit 26 from flowing backward toward the entrance of the optical fiber unit U. Conventionally, the sealing unit 24 having a shape of such as O-ring is adhered to the outer circumference of the optical fiber unit U in order to effectively prevent backward flow of the fluid.

However, the surface of the optical fiber unit U has very weak structure since the glass beads 12 are formed thereon. Thus, if the sealing unit 24 is installed in contact with the outer circumference of the optical fiber unit U, the surface may be damaged while the optical fiber unit U passes through the sealing unit 24 during installation.

In such a reason, the sealing unit 24 is not contacted with the outer circumference of the optical fiber unit U but has a predetermined gap. Accordingly, while the air pressure installation is conducted using the conventional optical fiber unit installation apparatus, a significant amount of fluid is flowed backward toward the entrance A and leaked through the gap between the sealing unit 24 and the outer circumference of the optical fiber unit U, thereby causing noise and deteriorating installation performance and efficiency of the pressing unit 26.

DISCLOSURE OF INVENTION

The present invention is designed to solve the problems of the prior art, and therefore an object of the invention is to provide an optical fiber unit installation apparatus which is provided with a means for preventing fluid from flowing backward toward an entrance of the optical fiber unit and leaking out.

In order to accomplish the above object, the present invention provides an optical fiber unit installation apparatus, which includes an optical fiber unit supplier; a blowing head having an entrance into which an optical fiber unit supplied from the optical fiber unit supplier is introduced, and an exit communicated with the entrance and combined with an installation tube for air pressure installation; a pressing unit for applying air pressure to the optical fiber unit introduced into the blowing head so that the optical fiber unit is inserted into the installation tube; and a fiber sealing unit which is an aggregation of fur-type elastic fibers mounted in an advancing path of the optical fiber unit through the blowing head, the fiber sealing unit preventing leakage of fluid by surrounding the inserted optical fiber unit so that fiber ends thereof are contacted with the optical fiber unit.

The optical fiber unit installation apparatus preferably further includes a driving roller unit for pushing the optical fiber unit into the installation tube with rotating on both sides of the optical fiber unit.

In the present invention, the fur-type fiber preferably has a function of eliminating static electricity. In addition, the fur-type fiber is preferably inclined toward an advancing direction of the optical fiber unit when being provided to the fiber sealing unit.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Hereinafter, preferred embodiments of the present invention will be described in detail referring to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 3:
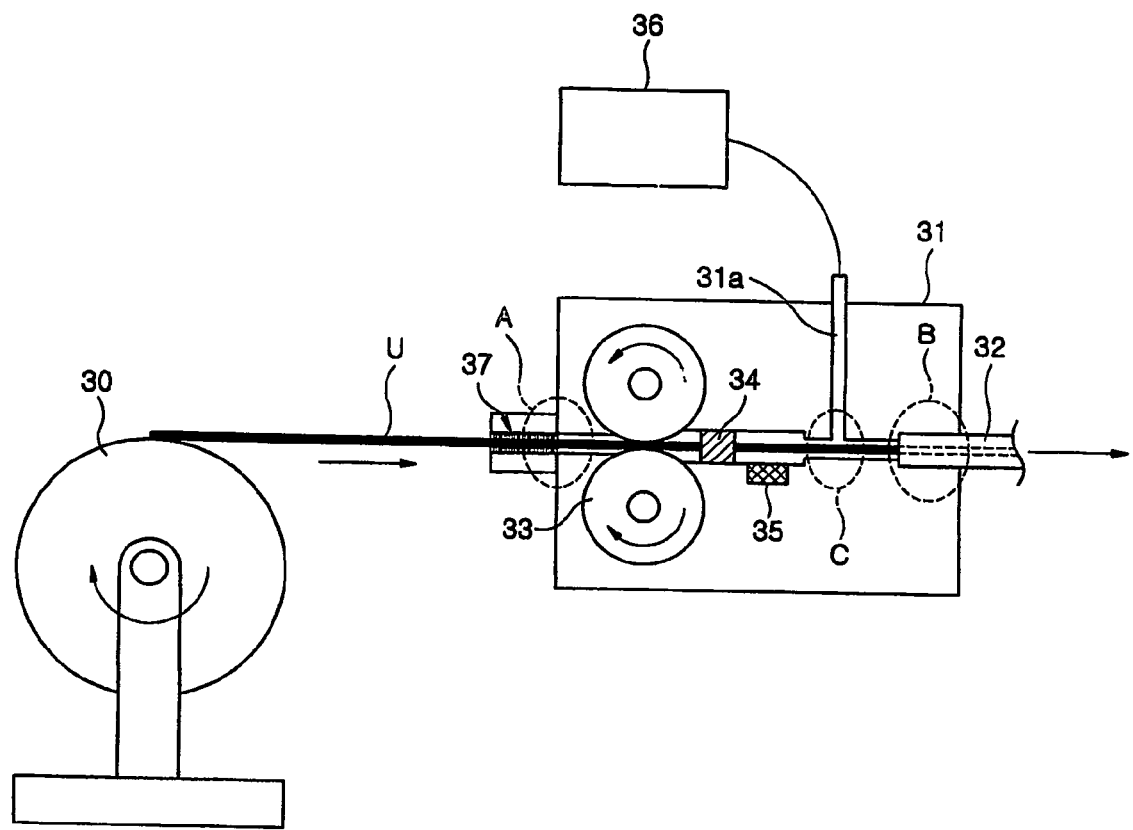
FIG. 3 is a schematic view showing an optical fiber unit installation apparatus according to a preferred embodiment of the present invention.

FIG. 3 shows an optical fiber unit installation apparatus according to a preferred embodiment of the present invention.

Referring to FIG. 3, the optical fiber unit installation apparatus of the present invention includes an optical fiber unit supplier 30, a blowing head 31, a pressing unit 36, and a fiber sealing unit 37.

The optical fiber unit supplier 30 is generally provided with a general optical fiber unit U for air pressure installation so that the optical fiber unit U is wound around a bobbin. The optical fiber unit U provided to the optical fiber unit supplier 30 is supplied to the blowing head 31 alone or in multiple, and then inserted and installed in an installation tube 32 for air pressure installation.

The blowing head 31 has an entrance A into which the optical fiber unit U is introduced, and an exit B communicated with the entrance A. At the exit B of the blowing head 31, a general installation tube 32 for air pressure installation is combined. On the while, the pressing unit 36 is connected to a conduit 31a diverged from one point between the entrance A and the exit B.

The pressing unit 36 applies air pressure so that the optical fiber unit U is inserted into the installation tube 32. A pressure exerted by the pressing unit 36 is preferably set in the range of 10 to 15 atm, but not limited in that range. The compressed air generated by the pressing unit 36 is introduced into the installation tube 32 via the conduit 31a of the blowing head 31 with applying pressure to the optical fiber unit U.

The blowing head 31 is also provided with a driving roller unit 33 in order to control an installation speed of the optical fiber unit U. The driving roller unit 33 has two rollers which rotate with the optical fiber unit U interposed therebetween, thereby pushing the optical fiber unit U into the installation tube 32.

Additionally, the blowing head 31 may further include a buckling sensor 35 installed around the optical fiber unit U which advances into the installation tube 32, for example, on the outer circumference of a guide pipe through which the optical fiber unit U passes. The buckling sensor 35 senses an advancing state of the optical fiber unit U. In addition, the buckling sensor 35 detects whether the optical fiber unit U is stopped due to an obstacle or buckled beyond a critical point while the optical fiber unit U is advancing in the installation tube U. If it is, the buckling sensor 35 makes the driving roller unit 33 stop so that the installation of the optical fiber unit U is stopped.

The fiber sealing unit 37 is provided at a point of the blowing head 31, preferably at the entrance A. The fiber sealing unit 37 prevents the compressed air, which flows into the blowing head 31 through the conduit 31a of the blowing head 31, from partially flowing backward in a direction opposite to the advancing direction of the optical fiber unit U and then leaked out.

An installation position of the fiber sealing unit 37 is not limited to the drawing, but may be selected in the range between the entrance A of the blowing head 31 and a diverging point C. Here, the diverging point C is a point at which the conduit 31a starts to diverge from the advancing path of the optical fiber unit U, which connects the entrance A and the exit B of the blowing head 31.

Figure 4:
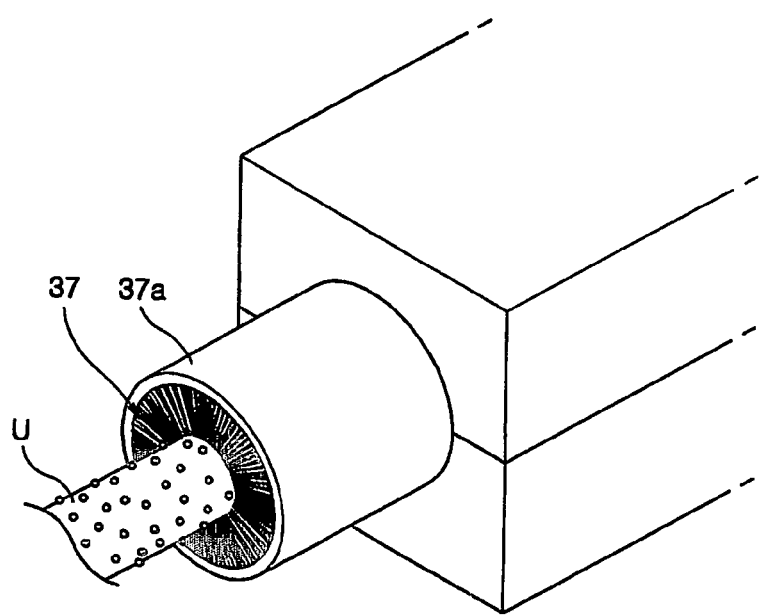
FIG. 4 is a perspective view showing an appearance of a fiber sealing unit of FIG. 3.

FIG. 4 shows an appearance of the fiber sealing unit 37 in more detail.

Referring to FIG. 4, the fiber sealing unit 37 is an aggregation of a plurality of fur-type elastic fibers. Preferably, the fiber sealing unit 37 is provided on the inner wall of a pipe-type support member 37a, which composes the entrance A of the blowing head 31 to which the optical fiber unit U is introduced.

A plurality of the fibers composing the fiber sealing unit 37 are arranged to substantially surround the outer circumference of the introduced optical fiber unit U, and so that ends of the fur-type fibers are contacted with the surface of the optical fiber unit U. Thus, the fur-type fibers prevent the fluid from flowing backward in a direction opposite to the advancing direction of the optical fiber unit U.

Figure 5:
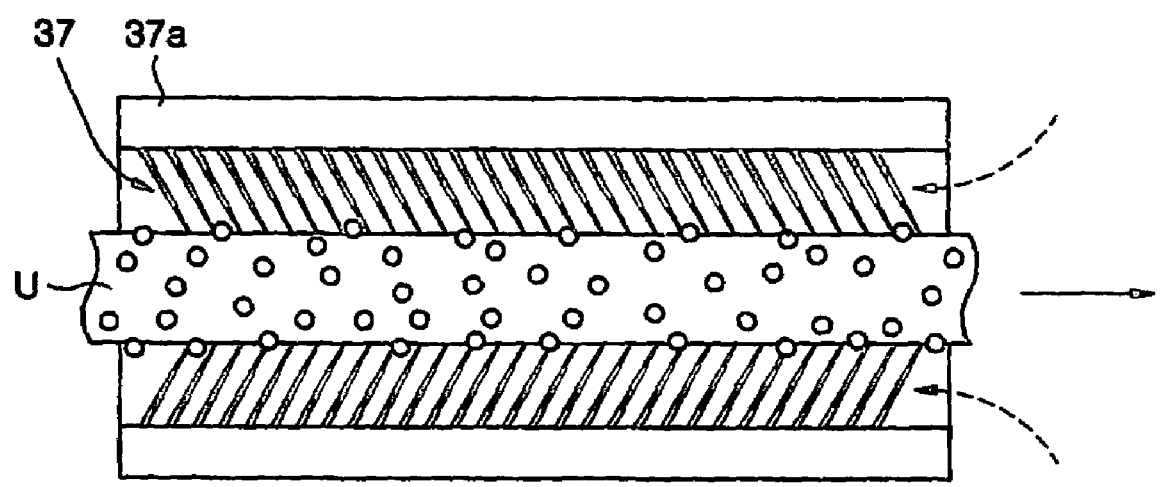
FIG. 5 is a sectional view showing that an optical fiber unit passes through the fiber sealing unit of FIG. 3.

The fur-type fibers which compose the fiber sealing unit 37 are preferably inclined at a predetermined angle toward the advancing direction (see an arrow expressed by a solid line in FIG. 5) of the optical fiber unit U. In this case, the fur-type fibers do not interrupt advancing movement of the optical fiber unit U toward the installation unit 32, and prevents the fur-type fibers from being leaned to a direction opposite to the advancing direction of the optical fiber unit U.

The fiber sealing unit 37 preferably has a function of eliminating static electricity together with dusts formed on the surface of the optical fiber unit U. For this purpose, the fur-type fiber may be made of an organic fiber, a polymer fiber or an acrylic fiber, which has a static electricity eliminating function, but not limitedly.

The fur-type fiber preferably includes carbon or conductive materials such as metal or metal ions in order to have the static electricity eliminating function. The fur-type fiber may be a polyethylene fiber or a polypropylene copolymer fiber.

Meanwhile, the blowing head 31 preferably has a sealing member 34 (see FIG. 3) surrounding the optical fiber unit U, which advances toward the installation tube 32, with a predetermined gap in order to prevent backward flow of the fluid more effectively together with the fiber sealing unit 37.

Now, operation of the optical fiber unit installation apparatus configured as mentioned above according to the present invention is described.

In order to insert the optical fiber unit U into the installation tube 32, which is mounted in advance, a compressed air is applied to the blowing head 31 using the pressing unit 36. Then, the optical fiber unit U, which is successively supplied from the optical fiber unit supplier 30, advances in the installation tube 32 by means of the pressure of the compressed air, thereby making the optical fiber unit U be installed. At this time, the compressed air supplied into the blowing head 31 partially flows backward toward the entrance of the optical fiber unit U. However, since the fiber sealing unit 37 is provided to the blowing head 31, an amount of compressed air leaked out of the blowing head 31 is remarkably reduced.

Figure 1:
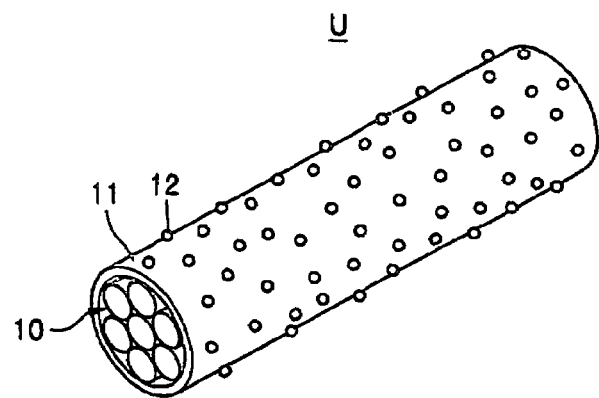
FIG. 1 is a perspective view showing an appearance of a conventional optical fiber unit for air pressure installation.
Figure 2:
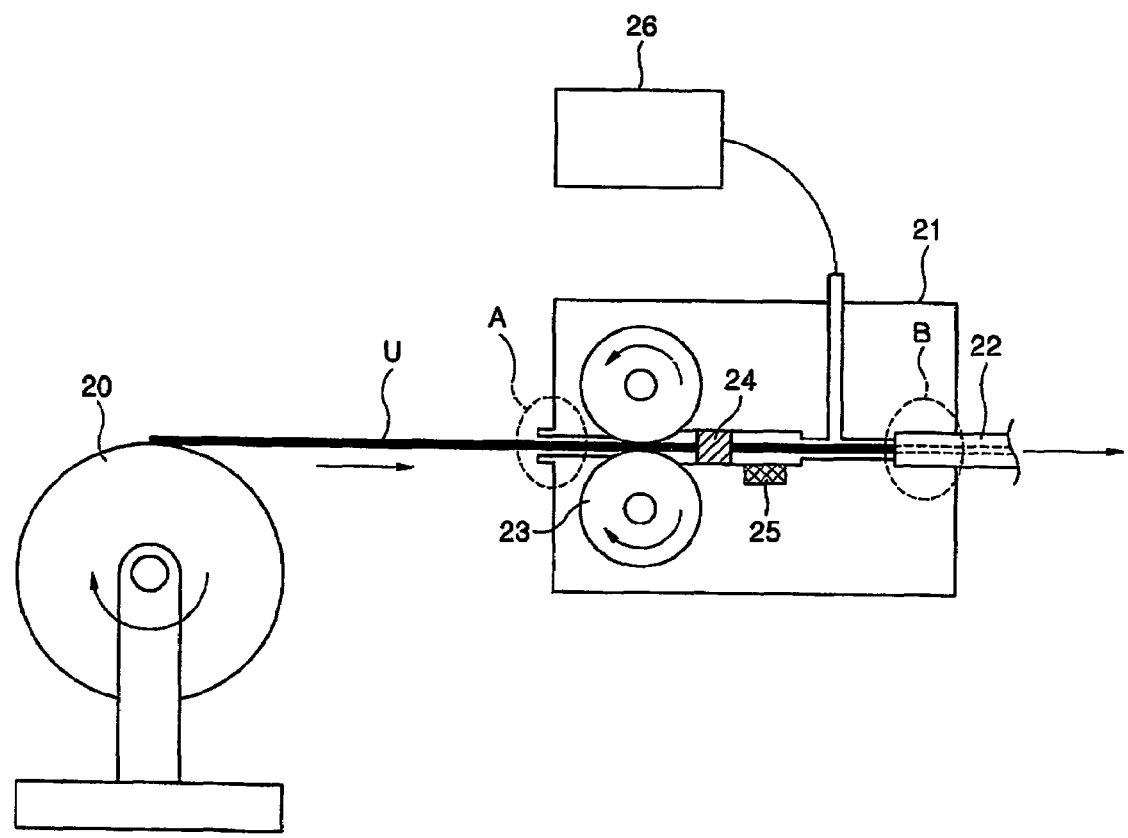
FIG. 2 is a schematic view showing an optical fiber unit installation apparatus according to the prior art.

The fiber sealing unit 37 is composed of an aggregation of fur-type fibers having predetermined elasticity, and substantially contacted with the advanced optical fiber unit U with the ends of the fur-type fibers surrounding the outer circumference of the optical fiber unit U. The fiber sealing unit 37 thus keeps contacting with the surface of the optical fiber unit U with being inclined to the advancing direction of the optical fiber unit U, while not exerting serious pressure to the surface of the optical fiber unit U, for example to the glass beads 12 (see FIG. 1). Thus, a leakage area of the fluid is not generated or greatly reduced between the optical fiber unit U and the fiber sealing unit 37, so the compressed air leakage phenomenon at the entrance of the optical fiber unit U is effectively prevented.

In addition, if the fiber sealing unit 37 is composed of fibers having a static electricity eliminating function such as a carbon fiber or a conductive fiber, the fiber sealing unit 37 may also eliminate static electricity charged on the surface of the optical fiber unit U when being contacted with the optical fiber unit U.

INDUSTRIAL APPLICABILITY

The optical fiber unit installation apparatus of the present invention prevents backward flow and leakage of the fluid with great efficiency since it has a means for preventing backward flow of the fluid, which is contacted with the surface of the optical fiber unit without giving serious pressure thereto. Thus, if the apparatus of the present invention is applied to the air pressure installation, noise is remarkably reduced during the installation work. In addition, in the aspect of the installation apparatus, many advantageous effects such as reduction of energy consumption and improvement of installation performance are expected.

Moreover, the installation apparatus of the present invention may prevent the optical fiber unit characteristics from be deteriorated due to static electricity by eliminating static electricity on the surface of the optical fiber unit while the air pressure installation is conducted.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An optical fiber unit installation apparatus comprising:
an optical fiber unit supplier;
a blowing head having an entrance into which an optical fiber unit supplied from the optical fiber unit supplier is introduced, and an exit communicated with the entrance and combined with an installation tube for air pressure installation;
a pressing unit for applying air pressure to the optical fiber unit introduced into the blowing head so that the optical fiber unit is inserted into the installation tube; and
a fiber sealing unit which is an aggregation of fur-type elastic fibers mounted in an advancing path of the optical fiber unit through the blowing head, the fiber sealing unit preventing leakage of fluid by surrounding the inserted optical fiber unit so that fiber ends thereof are contacted with the optical fiber unit.

2. An optical fiber unit installation apparatus according to claim 1, further comprising a driving roller unit for pushing the optical fiber unit into the installation tube with rotating on both sides of the optical fiber unit.

3. An optical fiber unit installation apparatus according to claim 1, wherein the fur-type fiber has a function of eliminating static electricity.

4. An optical fiber unit installation apparatus according to claim 3, wherein the fur-type fiber is an organic fiber or an acrylic fiber.

5. An optical fiber unit installation apparatus according to claim 3, wherein the fur-type fiber is a polymer fiber.

6. An optical fiber unit installation apparatus according to claim 5, wherein the polymer fiber contains carbon, metal or metal ion.

7. An optical fiber unit installation apparatus according to claim 5, wherein the polymer fiber is a polyethylene or polypropylene copolymer.

8. An optical fiber unit installation apparatus according to claim 1, wherein the fur-type fiber is inclined toward an advancing direction of the optical fiber unit.

* * * * *